March 13, 1934.    S. J. PASK    1,951,038
CAMERA MECHANISM
Filed Nov. 25, 1930    5 Sheets-Sheet 1

INVENTOR
Stanley J. Pask
BY his ATTORNEYS
Kenyon & Kenyon

March 13, 1934. S. J. PASK 1,951,038
CAMERA MECHANISM
Filed Nov. 25, 1930 5 Sheets-Sheet 2

Fig.4

INVENTOR
Stanley J. Pask
BY
Kenyon & Kenyon
ATTORNEYS.

March 13, 1934.   S. J. PASK   1,951,038
CAMERA MECHANISM
Filed Nov. 25, 1930   5 Sheets-Sheet 3

Fig. 5.

INVENTOR
Stanley J. Pask
BY
Kenyon & Kenyon
ATTORNEYS.

March 13, 1934.  S. J. PASK  1,951,038
CAMERA MECHANISM
Filed Nov. 25, 1930   5 Sheets-Sheet 4

INVENTOR
Stanley J. Pask
BY his ATTORNEYS
Kenyon & Kenyon

March 13, 1934.　　　　S. J. PASK　　　　1,951,038

CAMERA MECHANISM

Filed Nov. 25, 1930　　　5 Sheets-Sheet 5

INVENTOR
Stanley J. Pask
BY his ATTORNEYS
Kenyon & Kenyon

Patented Mar. 13, 1934

1,951,038

UNITED STATES PATENT OFFICE 1,951,038

CAMERA MECHANISM

Stanley J. Pask, Long Island City, N. Y., assignor to Al H. Woods, New York, N. Y.

Application November 25, 1930, Serial No. 497,983

16 Claims. (Cl. 88—16)

This invention relates to improvements in cameras and more particularly to improvements in cameras for taking a number of exposures on the same film or the same sensitized paper, and is a continuation in part of my pending application Serial Number 439,268, filed March 27, 1930, for camera mechanism.

In the art of photography, use has been made of screens positioned in front of the negative film or sensitized paper for producing unusual results. In one type of apparatus, the screen may be composed in part of transparent material and in other parts of opaque material, the opaque portion usually consisting of parallel lines of such width as to be a multiple of the distance between the respective lines. The screen of this character is positioned directly in front of and resting against the film or sensitized paper, and with the object to be photographed focused properly thereinfront an exposure may be made. The screen is then shifted a fractional amount so that the previously exposed portion of the sensitized medium is covered and a hitherto unexposed portion is made ready for exposure. The object to be photographed may be placed in a slightly different position and an exposure then made. This process may be repeated several times, depending entirely upon the relation of width of opaque lines to width of transparent space therebetween. For most purposes, the opaque lines are usually twice as wide as the transparent spaces, so that three exposures may be made on the same sensitized medium. However, other multiples may be used readily as will be apparent to anyone skilled in the art.

Heretofore in the practice of this type of photography, it has been customary to place a sensitized medium in a light-proof receptacle, position the receptacle within a camera, open the receptacle so that the sensitized medium is ready for exposure, then with a suitable screen in front of the medium expose the medium to the presence of the object to be photographed. It then became necessary to manually shift the screen, re-expose the medium and continue this process the required number of times, depending upon the aforesaid multiple. The receptacle for the medium must then be closed and the same withdrawn from the camera.

All of this operation requires considerable time, lacks accuracy and cannot be depended upon.

An object of the present invention is to provide novel mechanism for carrying out photography through screens having opaque spaces and arranged in multiple relative to the transparent spaces therebetween with accuracy and dispatch.

Other features and objects of the invention will become apparent by reference to the following detailed description taken in connection with the accompanying drawings, wherein.

Referring now to the drawings, 10 indicates a light-proof booth of any desired character having a portion 11 within which the object to be photographed may be positioned, the portion 11 being provided with a seat 12 and headrest 13 for use in case the object to be photographed is animate. Illumination may be provided by means of two electrical bulbs 14 mounted within reflectors positioned in such a manner as to focus a slight distance in front of an object placed on the seat or pedestal 12. A third light 15 may be positioned below the object to be photographed in such a way as to dissipate any shadows on the lower side of the object. This portion 11 of the booth is divided from the light-proof portion thereof by means of an irregular partition 16 extending from the top to the bottom thereof and having a recess 17 in which the camera mechanism 18 is placed.

The camera mechanism indicated at 18 may be positioned within the recess 17 of the booth upon a shelf 19. The actual mechanism of the recording portion of the camera is enclosed within a casing 20 above which may be placed a container 21 for the film or sensitized paper, upon which exposures are to be made. Communication between the casing 20 and the container 21 may be provided by matched slots in the respective cases.

Figure 1:
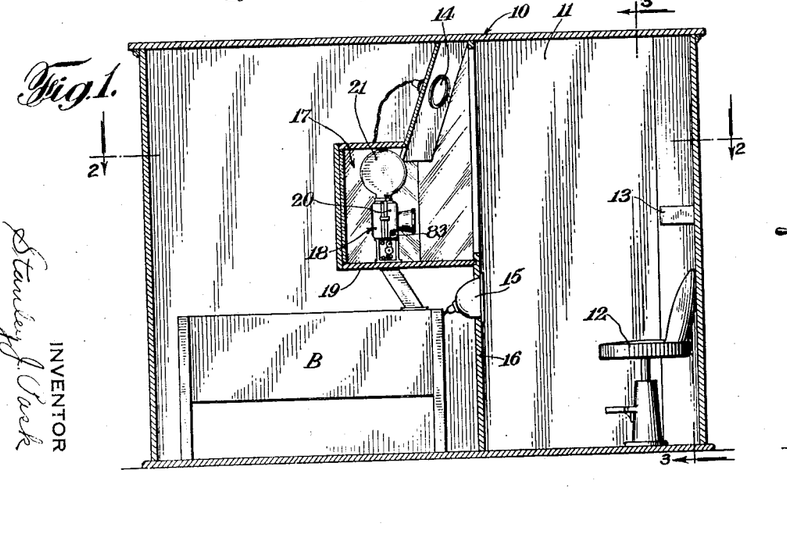
Figure 1 is a side view of the section of a complete installation embodying the mechanical camera of the present invention.
Figure 2:
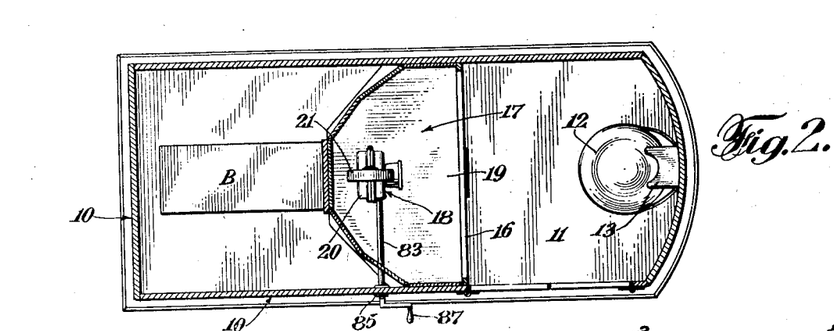
Fig. 2 is a section taken substantially on the lines 2—2 of Fig. 1.
Figure 3:
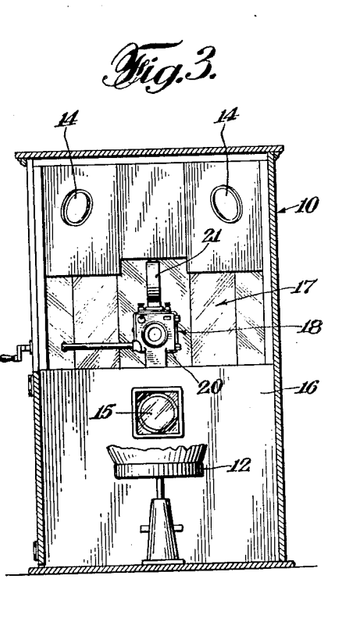
Fig. 3 is a section taken substantially on the lines 3—3 of Fig. 1.
Figure 4:
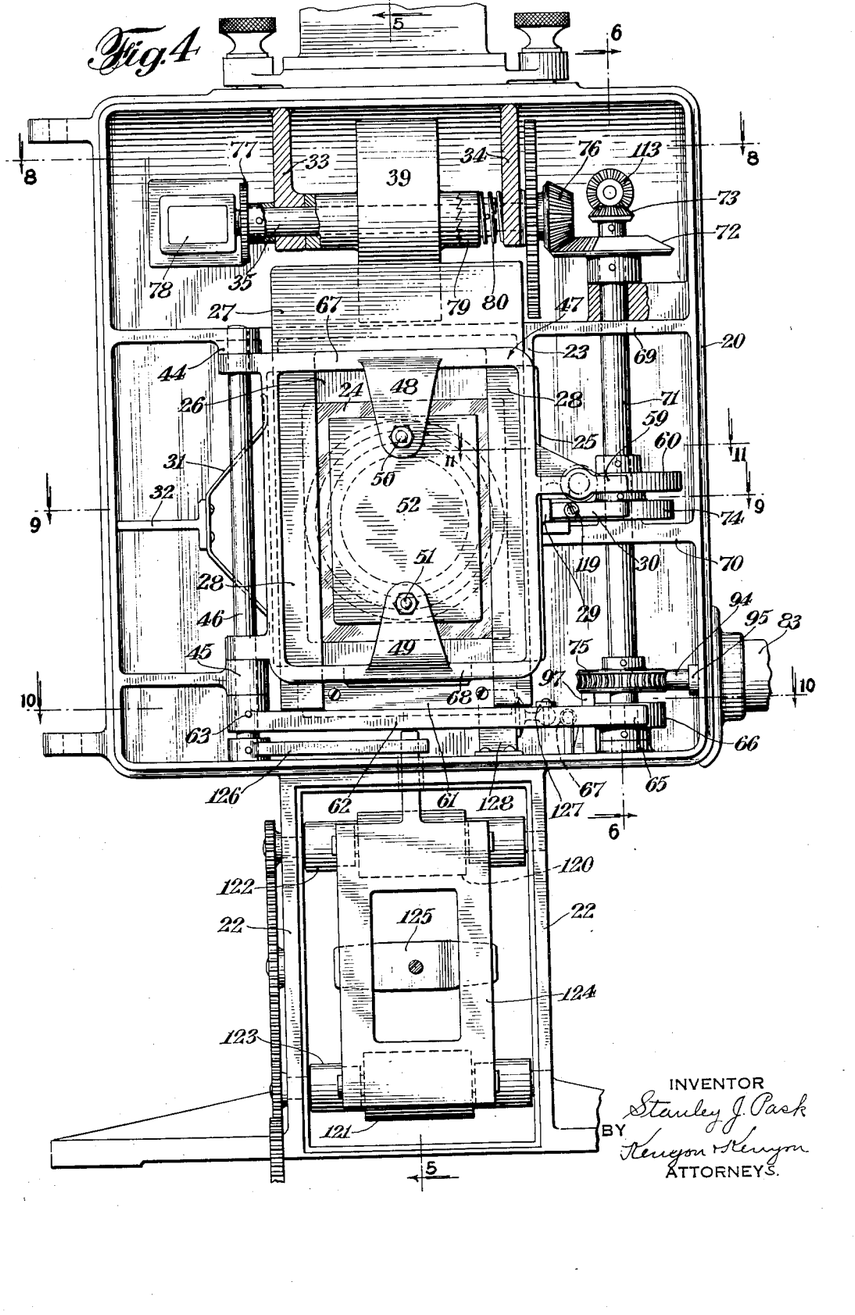
Fig. 4 is a rear view of a camera embodying the present invention.
Figure 5:
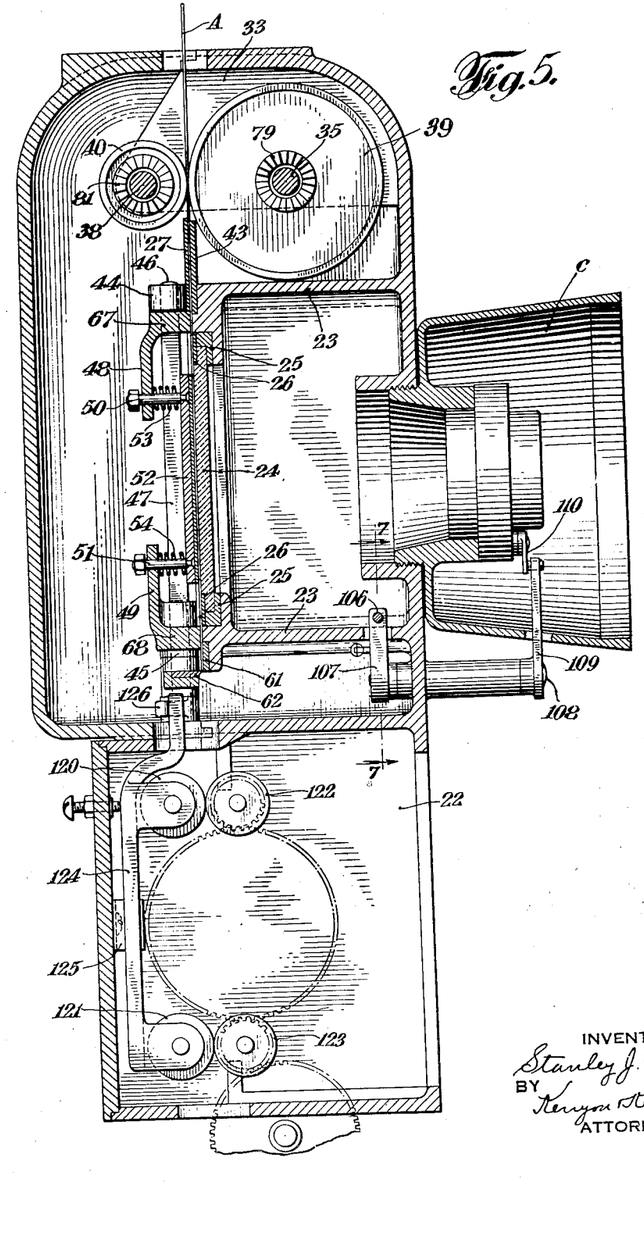
Fig. 5 is a section taken on the lines 5—5 of Fig. 4.

The mount for the recording mechanism comprises an integral base made up of spaced members 22 upon which the casing 20 rests. Supported above the bottom of casing 20 is a frame member 23 which serves as a mount for a screen 24 through which the rays from the image to be photographed pass on to the sensitized film or paper. This frame naturally has its vertical portion cut away in the shape of substantially a square to permit the passage of light rays. The screen 24 is fastened within a slidable mount 25 by means of a continuous square strip 26. As shown in Fig. 5, the mount 25 slides between horizontal surfaces provided within and as a part of frame 23. An upper plate 27 with two lower spaced legs 28 serves to hold the mount 25 within its proper slideway, this plate being secured to the rear vertical face of frame 23. One edge of mount 25 extends a considerable distance to one side of the screen 24 and the vertical face of this edge is provided with a shoulder 29 for engagement with a crank 30, the operation of which will be described hereinafter in detail. The other edge of mount 25 is in engagement with a spring 31 fixed to an extension 32 of frame 23.

Mounted on the casing 20 are ribs 33 and 34, the rib 33 serving as one bearing for a shaft 35, while the other end of said shaft is journaled in rib 34. Extending horizontally from ribs 33 and 34 are extensions 36 and 37 respectively which serve as bearings for a shaft 38. Mounted loosely on shaft 35 between the ribs 33 and 34 is a roller 39 in frictional engagement with roll 40 mounted on the aforesaid shaft 38 between the extensions 36 and 37. The two shafts 35 and 38 are connected by means of gears 41 and 42 respectively. As will be seen from Fig. 5, the guide plates 27 and 43 extend upwardly to stop just short of a line connecting the axes of rollers 39 and 40.

Extending inwardly from casing 20 are a pair of members 44 and 45 which are of such shape as to be provided with holes for the passage of hinge pin 46. Pivotally secured between the members 44 and 45 by means of this pin 46 is a frame or gate 47 hollow in the central portion but having lugs 48 and 49 extending inwardly from the bottom and top edges thereof. These lugs 48 and 49 serve to support pins 50 and 51, one end of each of which is secured to a flat plate 52 faced with felt or other suitable material and the other ends of which extend through the lugs. These free ends are threaded for the reception of nuts to prevent disengagement of the plate 52 from the gate 47. Mounted between the plate 52 and the lugs and encircling the pins 50 and 51 are springs 53 and 54 which serve to force plate 52 against screen 24. The nuts on the ends of these respective pins are so positioned as to permit unrestrained force being applied by the springs to push the plate against the screen.

Figures 6, 7, 12, 13:
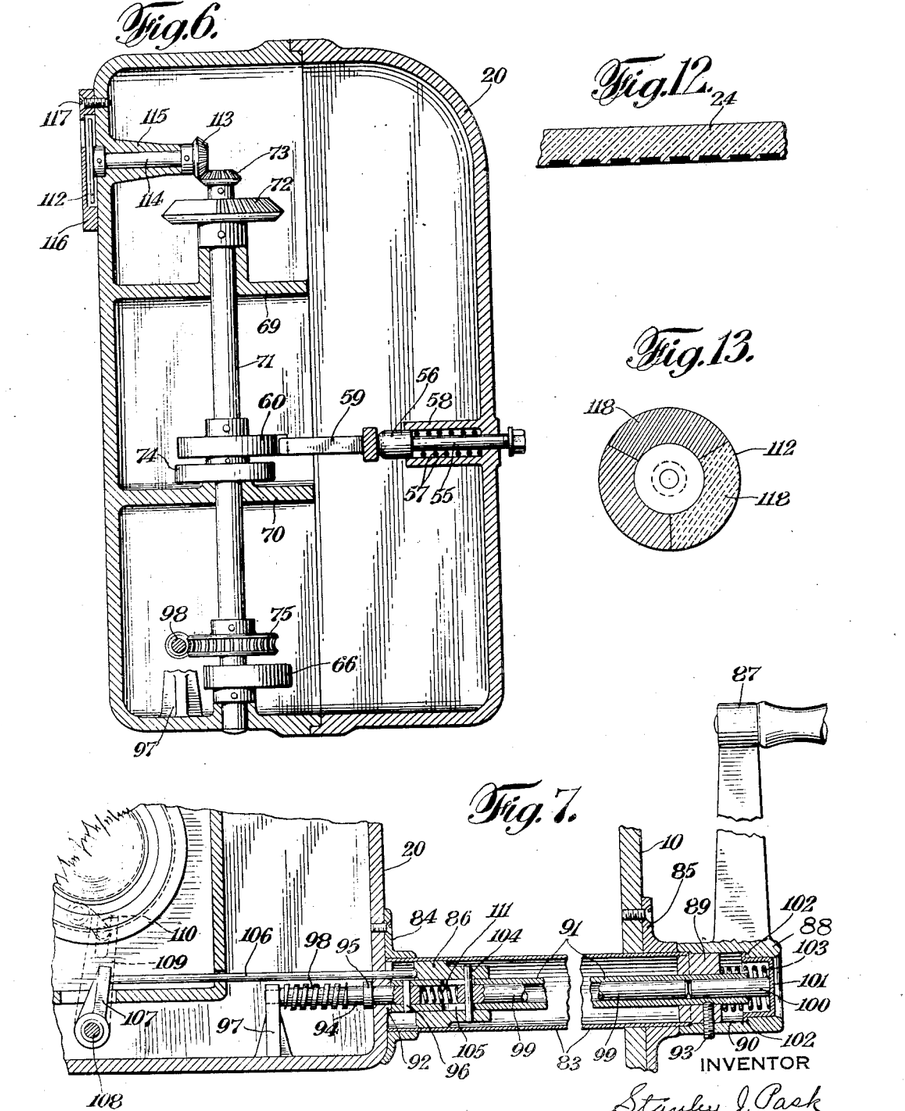
Fig. 6 is a section taken on the lines 6—6 of Fig. 4.
Fig. 7 is a cross-section of the operating and exposure mechanism.
Fig. 12 is an enlarged cross-section of a screen used in the camera of the present invention.
Fig. 13 is the indicating disc utilized for indicating the position of the screen relative to the sensitized film or paper.

Mounted between the back of the casing 20 and the gate 47 is a pintle 55 having an enlarged head 56 as shown in Fig. 6. The outer end of this pintle 55 is threaded for the reception of a washer and nut serving to slidably secure the pintle 55 to casing 20. A spring 57 constrained in pintle guide tube 58 forces head 56 against the gate 47 whereby pressure is exerted to move gate 47 inwardly about its pivotal axis. Extending from the outer edge of gate member 47 is a curved tongue 59, the extremity of which is adapted to engage a cam 60, the operation of which will be described later.

Fastened to the lower horizontal edge of frame 23 within an inset thereof is a blade 61 which coacts with a movable blade 62 to sever segments of sensitized film or paper after the same has been exposed. Movable blade 62 is keyed to the member 46 by means of the pin 63 to hold this blade in place. Blade 62 is provided with a tongue 64 (Fig. 10) which at all times rests under the stationary blade 61 and insures clean severance action between the two knives. The outer end of blade 62 is provided with a right-angular head 65 adapted for engagement with a cam 66 and normally held thereagainst by means of spring 67', one end of which is fastened to the blade and the other end of which is fastened to a pin rising from the bottom of casing 20. It will be noted in Fig. 10 that, as long as the head 65 is in contact with the portion of cam 66 of greatest diameter, blade 62 is held outwardly an amount sufficient to permit the passage of a film or strip of sensitized paper A which is shown in the various figures as a thin double line; but that, when the head 65 drops in the portion of cam 66 of reduced diameter, the two blades 61 and 62 will sever the strip A.

Referring to Fig. 5, it will be noted that upper and lower horizontal portions of gate 47 are provided with upper and lower fingers 67 and 68 respectively, which, when the member 47 is clamped in position, serve to hold the strip A firmly in place against any motion.

Figures 9, 10, 11:
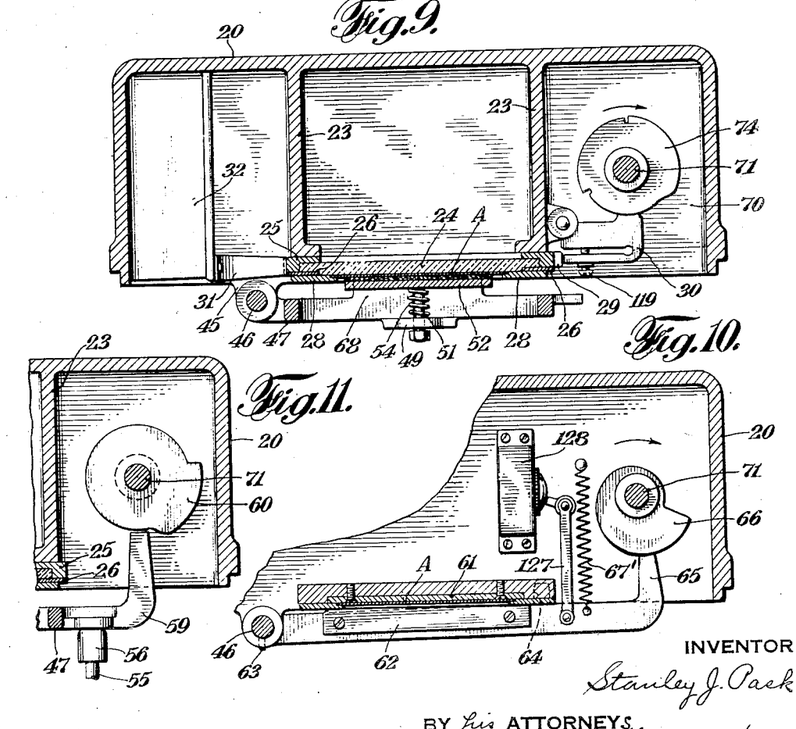
Fig. 9 is a section taken on the lines 9—9 of Fig. 4.
Fig. 10 is a section taken on the lines 10—10 of Fig. 4.
Fig. 11 is a section taken on the lines 11—11 of Fig. 4.

Extending from one side of the frame 23 to the side of casing 20 are a plurality of cross ribs 69 and 70 through which passes a vertical shaft 71. Secured to the top of the shaft 71 and resting against the upper rib 69 is a segmentary bevel gear 72, while just above gear 72 on shaft 71 is a second smaller bevel gear 73. Above rib 70 and mounted on shaft 71 is the cam 60 which, as shown, has a portion of considerably greater diameter than the major part thereof. Above rib 70 below cam 60, and secured to shaft 71, is a cam 74 having equal portions of varying diameters as illustrated in Fig. 9. The crank 30 which is pivoted to a boss on frame 23 has one edge resting against this cam 74 and the other edge against shoulder 29 of mount 25. Mounted on the lower end of shaft 71 is a worm gear 75 and immediately below that cam 66 against which head 65 of blade 62 rests.

Secured to one end of shaft 35 is a bevel gear 76 so positioned as to be engaged by the teeth of segmentary gear 72. A gear 77 secured to the other end of shaft 35 actuates a visible revolution counter 78 thereby indicating to the one in charge the total number of complete exposures made. Positioned between roller 39 and rib 34 is a ratchet mechanism comprising a clutch member 79 pressed into positive engagement with the hub of roller 39 by spring 80. Member 79 is slidably keyed to shaft 35 which rotates independently of roller 39. Similar provision comprising clutch 81 and spring 82 is made for roller 40 for purposes which will be set forth later in this specification.

Running from the casing 20 through the side of the booth 10 at right angles is a horizontal pipe or tube 83 which terminates in the socket 84. The outer end of the tube 83 is fixed in place by a collar 85 beyond which it extends a short distance. Within this tube is to be found all the actuating mechanism for the camera. Closely fitting within the tube 83 and near the camera end thereof is a sliding member 86 drilled for the passage of certain operating devices. A crank handle 87 is provided on the outside of the booth 10, a recess in the hub 88 of which closely fits over the short extension of tube 83. A round block 89 is located in the counterbore 90 of hub 88 and flush with the inner end thereof. The complementary recesses in the block 89 and hub 88 do not grip pipe 83 in any manner.

Block 89 is drilled for the passage of a small tube 91 which abuts a boss 92 on the side of casing 20 and running through sliding member 86 and block 89 extends part way into hub 88. A set screw 93 keying hub 88, block 89 and tube 91 together secures the latter to the crank handle 87. Inserted in the camera end of tube 91 is an extension of worm shaft 94 which passes through the wall of casing 20 and has an enlarged portion 95 abutting on the inner side thereof. Portion 94 is immovably fastened to tube 91 by pin 96, preventing accidental dislodgement of the crank handle 87 by pulling outwardly. The far end of the worm shaft 94 is supported in a bearing bracket 97. Positioned between the shoulder 95 and the bracket 97 on the shaft 94 is a worm 98 coacting with worm wheel 75 to turn the shaft 71 one-third of a revolution for each complete revolution of crank handle 87.

Extending substantially the length of tube 91 and inserted therein is a rod 99 contacting with a shorter section 100 extending out of tube 91 into hub 88 where its flat end abuts a push button member 101 snugly fitting a considerable axial length of the smaller, outer bore of hub 88. Flanges 102 limit the outward movement of button 101. A spring 103 tends to hold the button 101 normally in the position illustrated in Fig. 7. Fitted through rod 99, tube 91 and the shank of block 86 is a pin 104 free to slide a limited distance back and forth with the rod 99 and block 86 in slots 105 of tube 91. Bearing against the face of block 86 is a smaller rod 106 whose other end rests against a lever 107 keyed on counter shaft 108. Referring now to Fig. 5, the other end of shaft 108 is secured to bifurcated lever 109 in operative engagement with the shutter mechanism 110 of a camera. The various members of this exposure device are maintained in normal position by a spring 111 tending to resist inward movement of rod 106. Relations between parts 86, 99 and 106 are such that rod 106 will not move inwardly, regardless of any rotation of crank handle 87 until button 101 in the hub 88 is firmly pressed by the operator.

In order that the operator of the machine may know the position of the screen, visual indicating apparatus is provided. The actual visual signal comprises, in the present instance, a disc 112 marked off in annular segments of various colors, located above and to one side of the lens mount on the front of casing 20. Topping shaft 71 is a small bevel gear 73 meshing with a similar gear 113 secured to shaft 114 which is journaled in a drilled bearing boss 115 integral with casing 20. The disc 112 already referred to is fastened to the other end of shaft 114. Covering disc 112 is a plate 116 attached to the camera by screws 117 and having an opening in the face thereof not larger than one annular segment marked on the disc 112. In the present embodiment, three exposures are made and three differently colored annular segments 118 cover the periphery of disc 112. Thus when crank handle 87 is revolved once, disc 112 moves a third of a revolution and a different color is presented to the operator's eye.

The operation of the device is substantially as follows: Assuming that the machine has been positioned on the shelf provided therefor in the booth, a reel of sensitized material A which may be film or paper is mounted within a container which is positioned on top of the case surrounding the camera mechanism. The opening in the paper-containing case and that upon which it is mounted are fixed in alignment so that the material A can pass from one into the other readily. The surrounding casing 20 has a door in the rear thereof which may be opened. Supported beneath the camera in any desirable manner is a receptacle B for the reception or development of the exposed material. In this condition, the machine is ready to be supplied with sensitized material. The various parts are in the following order. The bevel gear 76 is just out of contact with the segmental gear 72, crank 30 rests against the portion of cam 74 of smallest diameter and head 65 of movable blade 62 rests in the slot in cam 66.

With the mechanism in this condition, the sensitized material is fed into the machine, being forced downwardly by the friction exerted between the rollers 39 and 40 and being guided by the plates 27 and 43 and by the two grooves in the downwardly extending legs 28 of plate 27. Since these plates extend downwardly below the top of frame 23, it is impossible for the strip of material A to become wound around either roller 39 or 40. Before the strip can be completely introduced into the machine, it is necessary to open the back door of the casing 20 and swing gate 47 outwardly about its pivotal point. This movement withdraws the pressure fingers 67 and 68 and the plate 52 so that the paper may be further introduced to lie against the screen 24. Downward movement of the strip, however, is limited by the movable blade 62 which has moved to partly underlie blade 61. With the strip in this position, the gate 47 is closed and the back door shut so that pintle 55 will hold the same in place with the tongue 59 in the position shown in Fig. 11. The spring 57 forces the gate inwardly in such a manner that the contact members 67 and 68 firmly hold the strip against movement in any direction. At the same time, the plate 52 is forced against the paper by action of springs 53 and 54 an amount sufficient to insure the strip being held flat against screen 24.

As shown in Fig. 12, the screen 24 in the present instance is made up of some transparent material such as glass which is provided with a number of opaque lines of width substantially double the width of the transparent spaces between the several lines. The machine in the present instance is shown to operate with a screen having the opaque lines of a width double that of the transparent lines, but it is to be understood that the opaque lines may be three times, four times or any other multiple of the width of the transparent spacing. In the present condition, the spring 31 forces screen mount 25 against crank 30 so that the screen is in its furthest position away from extension 32 to which spring 31 is secured. Crank 30 has a vernier adjustment 119 to take up all wear.

The strip of material being in place and being locked therein by means of gate 47 and its associated parts, the door of case 20 may be closed, placing the machine in condition for operation. The lens of the camera and the accompanying shutters are mounted conventionally at the inner end of funnelar chamber C which is attached to the front of the casing 20. The object to be photographed is then positioned directly in front of the lens, if so desired, upon the stool or pedestal 12 which has the steadying headrest 13 for animate objects. Illumination is provided by focusing lights 14 and 15, which may be energized by the operator or by the insertion of a coin in a slot (which with its mechanism is not shown). The position of the screen within the camera mechanism will be shown by the disc indicating apparatus.

Figure 8:
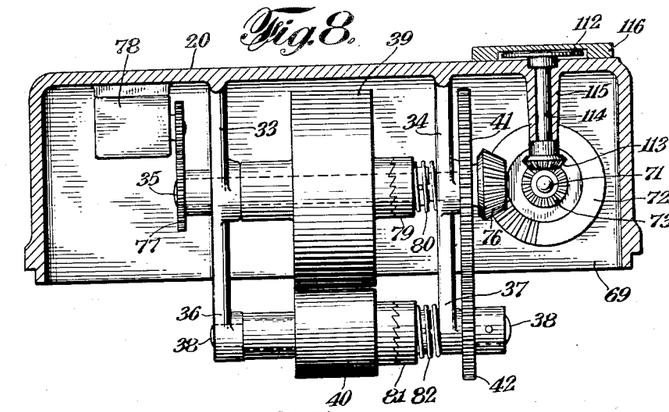
Fig. 8 is a section taken on the lines 8—8 of Fig. 4.

With the object to be photographed in position, the operator presses button 101, forcing rods 99 and 100 and block 86 inwardly causing a still smaller rod 106 to partially rotate lever shaft 108 whereupon a second lever 109 operates the shutter arm 110. As soon as the exposure has been made, the operator gives the crank handle 87 on the outside of the cabinet a complete turn. When this handle is revolved once, the worm gear 98 also makes one complete revolution through the connecting member 91. For each revolution of gear 98, the worm wheel 75 and the shaft 71 secured thereto move through the third part of a complete rotation. The gearing ratio between worm 98 and wheel 75 is entirely arbitrary and dependent upon the number of exposures to be made on the sensitized strip A, in the present instance three. If the operator should carry the crank handle 87 around too far, a glance at the visual indicator will show the overlapping so that he may rectify his mistake. If, on the other hand, the handle 87 is slightly moved in a direction counter to normal, on the feeding revolution, the ratchet clutches (Fig. 8) on the feed rolls 39 and 40 will not engage and no troublesome buckling or shifting of the sensitized material A will ensue. Here again the visual indicator should be consulted to prevent overlapping of the exposures.

It will be seen from the foregoing that the operation just described has caused gear 75 and the shaft 71 to be rotated through a third of one revolution. This rotation has advanced gear 72 a part of a revolution, has moved gear 73 a third of a revolution, presenting a new color on the disc showing the screen position to the operator by reason of the various connections to disc 112, advanced cam 60 a part of a turn; advanced cam 74 a third of its revolution, bringing the portion of the second greatest diameter into contact with crank 30. Due to the slight difference in diameter of the three parts of this cam 74, the crank 30 is moved a slight distance, thereby forcing screen mount 25 a fractional distance against the pressure of spring 31. This movement is sufficient to cause the opaque lines of the screen to cover the part of the strip A just exposed and to uncover a previously unexposed part of the strip into position ready for exposure. Also, the cam 66 has been moved a third of a revolution, causing the head 65 to ride up out of the slot of this cam on to a more enlarged portion thereof, and the camera is ready to make a second exposure.

The operator then changes the position of the object to be photographed, presses the button 101 operating the shutters and then gives the crank handle a complete turn, thereby causing one complete revolution of the worm shaft 94, and a third of a revolution of the shaft 71 and all of the various cams and rollers affixed thereto, again. The only result of this second movement of the shaft is to cause the screen 24 to be moved to its third position through the agency of cam 74 and crank 30 and at the same time to change the position of the indicating disc 112. In this third position, the screen 24 has been moved so that the opaque parts thereof completely cover the two hitherto exposed parts of the strip A, leaving the remaining unexposed portion ready for exposure.

The operator changes the position of the object to be photographed, presses the button 101 until the shutter has been actuated, then rotates handle 87 a third time, whereupon the shaft 71 is rotated through its final part of a complete revolution. This final rotation accomplishes several results. One movement occasioned thereby is for tongue 59 of gate 47 to ride upon the shoulder of cam 60. This movement forces the gate 47 outwardly about its pivotal axis a slight distance (the spring 57 yielding) releasing the contact fingers 67 and 68 and the pressure plate 52. Another movement causes head 65 to ride up on the high portion of cam 66, thereby forcing movable knife blade 62 out of contact with stationary knife blade 61. All pressure is then removed from the strip so that, as the shaft 71 rotates, the teeth on the segmentary gear 72 come into contact with the teeth of gear 76, thereby rotating the rolls 39 and 40, causing the strip A to be advanced from the casing on top of the device and pushing the portion of the strip which has been exposed below the screen. The number of teeth in the segmentary gear 72 are sufficient to cause these two rollers to be rotated enough to force the strip downwardly until all of the previously exposed part thereof is below the lower edge of the frame 23 between the rollers 120 and 121 and rollers 122 and 123. The former pair of rollers are mounted on swivel frame 124 and are held away from the remaining pair by leaf spring 125 as the paper A is fed downwardly after the third exposure. As the final part of the revolution of shaft 71 is completed, the slot in cam 66 moves so that head 65 drops thereinto under the action of spring 67', bringing knife 62 into contact with strip A and severing the same, due to the coaction of the two knife blades. This act of severing the paper A partially revolves the hinge member 46 to which the movable knife 62 is secured, thereby moving a similar keyed arm 126, resting on the bottom of casing 20, inward to press frame 124 and thereby rollers 120 and 121 against the rotating rollers 122 and 123 respectively to push the severed portion of strip A into the receptacle or developer B in the bottom of the cabinet 10. A small rigid arm 127 secured to knife 62 snaps a switch 128 to turn out the lights 14 and 15 in the front of booth 10 until a new object is to be photographed.

As the shaft completes its revolution, the cam 74 has been moved so that its portion of smallest diameter is in contact with crank 30, the tongue 59 has resumed the position shown in Fig. 11 so that pressure has been applied to the new portion of strip A in three places, and gear 72 is out of mesh with gear 76. In this condition, we have the machine ready for a complete operation in the cycle hereinbefore set forth.

Since the embodiment illustrated has been shown to be operating with a strip of material, it is to be understood that the strip may be either a film, sensitized paper or any other material for the purpose of accomplishing the benefits of the invention. The use of the term "sensitized material" throughout the specification and claims is to be so construed. In the operation of the device using film, it may be deemed advisable not to sever the portions as they are exposed, and for this reason the knife blade may be rendered inoperative, in which event the film will merely pass down into the receptacle designed for that purpose.

It is to be understood from the foregoing that the present invention is of such character as to be capable of wide modification, and in view of this fact it is to be understood that the same is not to be limited by the illustrated embodiment but is to be limited only by the scope of the following claims.

I claim:

1. In a camera of the character described, a casing, a pipe projecting outwardly from the casing, a crank handle fitted on said pipe, pressure means mounted in the hub of said crank, and movable rod and block means in said pipe including a rod extending therefrom into said casing, adapted by means of said pressure means to operate elements within the casing to actuate the shutter mechanism substantially as described.

2. In a camera of the character described, a casing, a stationary pipe projecting outwardly from the casing, a crank fitted thereon, a tube mounted within said pipe, a plurality of rods in said tube, a push button mounted in the hub of said crank and contacting one of the said rods, a sliding member mounted in said pipe and keyed to said tube, a rod contacting said sliding member and extending from said pipe into said casing, and a lever connected to said last-mentioned rod within the casing, whereby, on the operation of the push button, the actuation of the shutter mechanism is effected, substantially as described.

3. A camera of the character described including, in combination, a casing, a vertical rotatable shaft mounted therein having a worm wheel attached thereto, a pipe fixed to said casing, a revoluble tube in said pipe having a crank for revolving the same, a worm shaft extending through the casing keyed to said tube and co-operating with the worm wheel on said vertical shaft to turn the same a predetermined distance on the revolution of the crank, said distance being determined by the ratio between said worm shaft and worm wheel, substantially as and for the purpose described.

4. A camera as in claim 3 wherein a movable visual indicator is mounted on the outside of the casing, a shaft connected thereto equipped with a gear, a second gear on top of the vertical shaft mounted in the casing, said gears meshing with each other on the rotation of the said vertical shaft to operate the visual indicator, substantially as and for the purpose described.

5. A camera of the character described including, in combination, a casing, a vertical rotatable shaft mounted therein having a worm wheel attached thereto, a slidable mount with a screen having alternate transparent and opaque portions, a fixed frame in said casing with a slideway for said mount, a plate for holding the mount within said slideway, one edge of said mount extending to one side of the screen and provided with a shoulder, and a spring attached to an arm extending from the casing engaging the other edge of the mount, a pipe fixed to said casing, a revoluble tube in said pipe having a crank handle for revolving the same, a worm shaft extending through the casing keyed to said tube and co-operating with the worm wheel on said vertical shaft to turn the same a predetermined distance on the revolution of the crank, substantially as and for the purpose described.

6. A camera of the character described including, in combination, a casing, a vertical rotatable shaft mounted therein having a worm wheel attached thereto, a slidable mount with a screen having alternate transparent and opaque portions, a fixed frame in said casing with a slideway for said mount, one edge of said mount extending to one side of the screen and provided with a shoulder, a spring attached to an extension from the casing engaging the other edge of the mount, a hinge pin, a gate pivotally attached thereto, a plate and lugs on said gate supporting pin and spring means whereby the said gate and plate are so held together as to permit the said springs to force the plate against the screen, a pipe fixed to said casing, a revoluble tube in said pipe having a crank handle for revolving the same, a worm shaft extending through the casing keyed to said tube and co-operating with the worm wheel on said vertical shaft to turn the same a predetermined distance on the revolution of the crank, substantially as and for the purpose described.

7. A camera of the character described including, in combination, a casing, a rotatable vertical shaft mounted therein having a worm wheel attached thereto, a slidable mount with a screen having alternate transparent and opaque portions, a frame fixed in said casing with a slideway for said mount, one edge of said mount extending to one side of the screen and provided with a shoulder, a spring attached to an extension from the casing engaging the other edge of the mount, a hinge pin, a gate pivotally attached thereto, a pressure plate, lugs on said gate supporting pin and spring means whereby the said gate and plate are so held together as to permit the said springs to force the plate against the screen, a pintle mounted in a tube between the casing and the said gate, a spring in said tube adapted to exert pressure on the said gate to force it inwardly about its pivotal axis, a pipe fixed to said casing, a revoluble tube in said pipe having a crank for revolving the same, a worm shaft extending through the casing keyed to said tube and co-operating with the worm wheel on said vertical shaft to turn the same a predetermined distance on the revolution of the crank, substantially as and for the purpose described.

8. A camera as in claim 7 wherein a crank is pivoted to the fixed frame, and a cam of varying diameter mounted on the vertical shaft, one edge of the crank resting against the said cam, and the other edge of the crank against the shoulder of the slidable mount, whereby on the rotation of the vertical shaft the crank is moved to force the said mount a fractional distance against the pressure of the spring contacting the other edge of the mount, substantially as and for the purpose described.

9. In a camera of the character described including a casing, a mount therein for a screen and means for holding a light sensitized material against the said screen, of a hinge pin in said casing, a gate pivotally attached thereto, said gate having upper and lower fingers adapted to hold the sensitive medium firmly in place above and below the said mount, substantially as and for the purpose described.

10. In a camera of the character described including a casing, a rotatable vertical shaft mounted therein having a worm wheel attached thereto, and a mount with a screen slidable in a frame, of means for feeding a strip of light sensitized material into position with a section thereof behind said screen, comprising rollers mounted on shafts in the casing in fractional engagement and connected by gears, a clutch member for each roller keyed to its shaft, a bevel gear on one of said shafts adapted to be rotated by a segmental gear on the said vertical shaft, a pipe fixed to said casing, a revoluble tube in said pipe having a crank handle for revolving the same, a worm shaft extending through the casing keyed to said tube and co-operating with the worm wheel on said vertical shaft to turn the latter and feed the sensitized material between the rolls, substantially as and for the purpose set forth.

11. In a camera of the character described including a casing in which are mounted a rotable shaft with an attached worm wheel, a frame for receiving a slidable mount with a screen, means for feeding a strip of light sensitized material behind said screen, and a hinge pin supporting a gate, means for severing a segment of the said sensitized material comprising a stationary blade fastened to said frame, and a movable blade keyed to said hinge pin, said movable blade having an angular extension, a cam of varying diameter on said rotatable shaft, said extension of the movable blade contacting with the portion of said cam of greatest diameter to permit the passage of the sensitized material between the two blades, whereby on the rotation of the shaft the said cam is operated to cause the extension of the movable blade to drop on to the portion of said cam of least diameter, substantially as and for the purpose described.

12. In a camera of the character described, including a casing in which are mounted a rotatable shaft with an attached worm wheel, a frame for receiving a slidable mount with a screen, means for feeding a strip of light sensitized material behind said screen, and a hinge pin supporting a gate, of means for severing a segment of the said sensitized material comprising a stationary blade fastened to said frame, and a movable blade keyed to said hinge pin, said movable blade having an angular extension, a cam of varying diameter on said rotatable shaft, said extension of the movable blade contacting with the portion of said cam of greatest diameter to permit the passage of the sensitized material between the two blades, whereby on the rotation of the shaft the said cam is operated to cause the extension of the movable blade to drop on to the portion of said cam of least diameter, a pipe fixed to the said casing, a revoluble tube in said pipe having a crank handle for revolving the same, a worm shaft extending through the casing keyed to said tube and co-operating with the worm wheel on the said rotatable shaft to operate the same on the revolution of the crank, substantially as and for the purpose described.

13. A camera as in claim 12 having means for removing a strip of sensitized material severed as therein claimed comprising an arm keyed to said hinge pin, two pairs of rollers, one pair being mounted on a swivel frame, and spring means for normally withholding them from contact with the other pair of rollers, whereby the partial revolution of the hinge member on the severing of the sensitized strip operates the arm keyed to it to actuate the swivel frame, thereby bringing the respective pairs of rollers into contact to remove the severed portion of the strip gripped between them, substantially as and for the purpose described.

14. In a camera of the character described, in combination with a casing in which are mounted a slidable mount for a screen having alternate transparent and opaque portions, a frame with a slideway for said mount, means for feeding a strip of light sensitized material into position behind the screen, pivotal means for applying pressure to hold the same in position, means for releasing said pressure, means for shifting said screen after an exposure has been made and means for advancing the material, of a pipe fixed to said casing, a revoluble tube in said casing, a worm shaft keyed to said tube extending into said casing, and a crank attached to the tube adapted on the rotation of the crank to actuate mechanism within the casing to release the pressure from said sensitized material, shift the screen and push the exposed part of the material below the said frame as it advances an unexposed part of the material to a position behind the screen, substantially as and for the purpose set forth.

15. In a camera of the character described, a casing, film-moving means in the casing, a stationary pipe extending outward from the casing, a revoluble tube in the pipe, a crank attached to said tube, a push button in the hub of said crank, sliding rod and block means in said pipe and tube adapted on the operation of the push button to operate mechanism within the casing to first expose a portion of the film, and a worm shaft attached to the tube and extending into the casing adapted on the rotation of the crank to thereupon initiate the operation of mechanism within the camera to move the film a predetermined distance, substantially as and for the purpose described.

16. In an entirely enclosed camera of the character described, in combination with a casing having therein a fixed frame, a mount for a screen slidable in said frame, means for feeding film into position behind said screen, and means for shifting said screen after exposure, of a stationary pipe extending from said casing, a revoluble tube in the pipe, a crank attached to said tube, a push button in the hub of said crank, sliding rod and block means in said pipe and tube adapted on the operation of the push button to operate mechanism within the casing to first expose a portion of the film, and a worm shaft attached to the tube and extending into the casing adapted on the rotation of the crank to thereupon initiate the operation of mechanism within the camera to shift the screen and advance the film a predetermined distance, substantially as and for the purpose described.

STANLEY J. PASK.